(12) United States Patent
Tokunaga

(10) Patent No.: US 9,138,685 B2
(45) Date of Patent: Sep. 22, 2015

(54) HIGHLY HYDROTHERMAL-RESISTANT SCR CATALYST AND MANUFACTURING METHOD THEREFOR

(75) Inventor: Keisuke Tokunaga, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 561 days.

(21) Appl. No.: 13/389,975

(22) PCT Filed: Aug. 25, 2010

(86) PCT No.: PCT/JP2010/064356
§ 371 (c)(1),
(2), (4) Date: Feb. 10, 2012

(87) PCT Pub. No.: WO2011/024847
PCT Pub. Date: Mar. 3, 2011

(65) Prior Publication Data
US 2012/0141370 A1 Jun. 7, 2012

(30) Foreign Application Priority Data
Aug. 27, 2009 (JP) .................................. 2009-196640

(51) Int. Cl.
| | |
|---|---|
| *B01J 29/06* | (2006.01) |
| *B01D 53/94* | (2006.01) |
| *B01J 29/072* | (2006.01) |
| *B01J 29/76* | (2006.01) |
| *B01J 35/00* | (2006.01) |
| *B01J 35/02* | (2006.01) |
| *B01J 35/04* | (2006.01) |
| *B01J 37/02* | (2006.01) |
| *B01J 37/08* | (2006.01) |
| *B01J 37/10* | (2006.01) |
| *B01J 37/30* | (2006.01) |
| *F01N 3/20* | (2006.01) |

(52) U.S. Cl.
CPC ........... *B01D 53/9418* (2013.01); *B01J 29/072* (2013.01); *B01J 29/7615* (2013.01); *B01J 35/002* (2013.01); *B01J 35/006* (2013.01); *B01J 35/023* (2013.01); *B01J 35/04* (2013.01); *B01J 37/0201* (2013.01); *B01D 2255/20738* (2013.01); *B01D 2255/502* (2013.01); *B01D 2255/9202* (2013.01); *B01J 37/08* (2013.01); *B01J 37/10* (2013.01); *B01J 37/30* (2013.01); *B01J 2229/18* (2013.01); *B01J 2229/186* (2013.01); *F01N 3/2066* (2013.01); *F01N 2510/063* (2013.01)

(58) Field of Classification Search
USPC ............................ 502/60, 64, 66, 74; 423/700
See application file for complete search history.

(56) References Cited

U.S. PATENT DOCUMENTS

| | | |
|---|---|---|
| 4,961,917 A | 10/1990 | Byrne |
| 7,794,680 B2 | 9/2010 | Naraki et al. |
| 2001/0008624 A1 | 7/2001 | Takahashi et al. |
| 2009/0196813 A1 | 8/2009 | Sobolevskiy et al. |
| 2010/0003178 A1 | 1/2010 | Tokunaga et al. |
| 2011/0136657 A1 | 6/2011 | Takamitsu et al. |
| 2011/0251048 A1 | 10/2011 | Ariga et al. |

FOREIGN PATENT DOCUMENTS

| | | | |
|---|---|---|---|
| CN | 101516778 | | 8/2009 |
| EP | 2 067 746 A1 | | 6/2009 |
| JP | 09-038485 | | 2/1997 |
| JP | 11-104493 | | 4/1999 |
| JP | 2904862 | | 6/1999 |
| JP | 11-228128 | | 8/1999 |
| JP | 2004-536756 | | 12/2004 |
| JP | 2005-177570 | | 7/2005 |
| JP | 2008-081348 | | 4/2008 |
| JP | 2010-000499 | | 1/2010 |
| WO | 02/41991 | | 5/2002 |
| WO | 2004/002623 | * | 1/2004 |
| WO | 2008/038422 | | 4/2008 |
| WO | 2008/132452 | | 11/2008 |
| WO | 2009-099426 | | 8/2009 |

OTHER PUBLICATIONS

U.S. Appl. No. 13/383,016 to Shigeru Hirano, filed Jan. 9, 2012.
U.S. Appl. No. 13/503,450 to Yusuke Naraki et al., filed Apr. 23, 2012.
Search report from International Patent Application No. PCT/JP2010/064356, mail date is Nov. 9, 2010.
Extended European Search Report issued with respect to counterpart European Application No. 10811896.9-1213/2471597, dated Jan. 24, 2013.
Chinese office action in CN201080038124.9, dated Mar. 7, 2014 along with an english translation thereof.
E.P.O. Office action, mail date is Mar. 4, 2014.
China Office action in CN 201080038124.9, dated Aug. 29, 2014 along with an english translation thereof.
Japanese office action in JP 2010-189436, dated Apr. 24, 2014 along with an english translation thereof.
Office Action in Chinese application No. 201080038124.9, dated Jun. 25, 2013 along with an english translation thereof.

\* cited by examiner

*Primary Examiner* — Elizabeth Wood
(74) *Attorney, Agent, or Firm* — Greenblum & Bernstein, P.L.C.

(57) ABSTRACT

An SCR catalyst including iron-containing β-type zeolite has high $NO_x$ reducing performance at a high temperature in the presence of a reducing agent, but does not have the sufficient reducing performance at a low temperature (not higher than 200° C.). A high $NO_x$ reduction rate of at least 45% at a temperature not higher than 200° C. is achieved by an SCR catalyst containing iron-containing β-type zeolite having a full width at half maximum (FWHM) on the X-ray crystal diffraction (302) plane of from 0.28 to 0.34° and a weight loss on heating to 900° C. after hydration treatment of from 15.0 to 18.0% by weight. The SCR catalyst can be manufactured by calcining iron-containing β-type zeolite at 700 to 850° C. under an atmosphere of a water vapor concentration of not more than 5% by volume.

9 Claims, 4 Drawing Sheets

HIGHLY HYDROTHERMAL-RESISTANT SCR CATALYST AND MANUFACTURING METHOD THEREFOR

TECHNICAL FIELD

The present invention relates to an SCR catalyst composed of iron and β-type zeolite, which is utilized for purifying nitrogen oxides in an automobile exhaust gas in the presence of a reducing agent, and to a manufacturing method therefor.

BACKGROUND ART

β-type zeolite is known as a zeolite which is used for a $NO_x$ reducing catalyst, in particular a $NO_x$ reducing catalyst using ammonia as a reducing agent (in general, called "SCR (an abbreviation of selective catalytic reduction) catalyst") (see Patent Document 1).

The SCR catalyst using β-type zeolite could not be used under a condition of low exhaust gas temperature because after an endurance treatment under a high-temperature water vapor atmosphere (hereinafter referred to as "hydrothermal endurance treatment"), the $NO_x$ reducing performance is lowered, in particular the deterioration of activity at a low temperature of not higher than 300° C. is large. Though it may be considered that the lowering of performances of the SCR catalyst using such β-type zeolite after the hydrothermal endurance treatment is mainly caused due to insufficient hydrothermal resistance of β-type zeolite, in particular a cause of lowering of the low-temperature activity has not been sufficiently elucidated yet. In any of performances of SCR catalysts reported by conventional documents, or performances of SCR catalysts using commercially available β-type zeolite, a $NO_x$ reduction rate at 200° C. after hydrothermal endurance treatment was less than 45%.

β-type zeolite is well known as a zeolite which is used for a catalyst or an adsorption agent, and as a method of enhancing its hydrothermal resistance, it is known to increase an $SiO_2/Al_2O_3$ molar ratio, or to make a crystal size large (see Patent Documents 2 and 3). But, in the case of making the $SiO_2/Al_2O_3$ molar ratio large, a solid acid, namely a catalytic activity point becomes few; whereas in the case of increasing the crystal size, a diffusion rate in the catalyst is lowered, and such is disadvantageous for catalyst properties under a transitional condition under which the temperature changes with time, so that sufficient dissolutions have not been attained yet in the application of SCR catalyst.

There have hitherto been made some proposals regarding an enhancement of performances of the SCR catalyst using β-type zeolite. For example, there is proposed a method of hydrothermally treating the SCR catalyst using β-type zeolite prior to the use, thereby achieving a treatment (Patent Document 4). But, performances after the endurance treatment were not sufficient yet. Also, there is reported a method of further adding a rare earth element to iron which is usually used as a supported metal of catalyst, thereby enhancing the hydrothermal resistance (see Patent Document 5). But, even in the subject method, nevertheless the expensive rare earth element is necessary, the $NO_x$ reduction rate at 200° C. was still less than 45%.

Also, there is proposed a technique for enhancing the endurance post-activity by an SCR catalyst in which an $SiO_2/Al_2O_3$ ratio, an SEM particle size and an $NH_3$ adsorption of β-type zeolite have been optimized (Patent Document 6). But, the $NO_x$ reduction rate at 200° C. was still less than 45%.

PRIOR ART DOCUMENTS

Patent Documents

Patent Document 1: Japanese Patent No. 2904862
Patent Document 2: JP-A-9-038485
Patent Document 3: JP-A-11-228128
Patent Document 4: JP-T-2004-536756
Patent Document 5: JP-A-2005-177570
Patent Document 6: JP-A-2008-081348

SUMMARY OF THE INVENTION

Problems to be Solved by the Invention

An object of the invention is to provide an SCR catalyst having high $NO_x$ reducibility, in particular $NO_x$ reducing performance at a low temperature after the hydrothermal endurance treatment and a simple and easy manufacturing method therefor.

Means for Solving the Problems

The present inventors made extensive and intensive investigations regarding a $NO_x$ reducing performance of an SCR catalyst using β-type zeolite, in particular an SCR catalyst after a hydrothermal endurance treatment at a low temperature. As a result, it has been found that by supporting a transition metal on a zeolite and then carrying out a calcination treatment to reveal specified crystal state and surface state, an interaction between the zeolite and the transition metal can be increased, and the $NO_x$ reducing performance at a low temperature, in particular not higher than 200° C. can be extremely increased, leading to accomplishment of the invention.

That is, the gist of the invention resides in the following (1) to (10).

(1) An SCR catalyst comprising iron-containing β-type zeolite having a full width at half maximum (FWHM) on the X-ray crystal diffraction (302) plane of from 0.28 to 0.34° and a weight loss on heating to 900° C. after hydration treatment of from 15.0 to 18.0% by weight.

(2) The SCR catalyst as set forth above in (1), wherein preferably, a proportion of an isolated iron ion relative to the whole amount of iron contained in the catalyst is from 60 to 90%, and an amount of the isolated iron ion is from 1.0 to 3.0% by weight relative to the catalyst weight.

(3) The SCR catalyst as set forth above in (1), wherein preferably, an amount of ion-exchanged iron contained in the catalyst is from 0 to 1.0% by weight relative to the catalyst weight.

(4) The SCR catalyst as set forth above in (1), wherein preferably, an $SiO_2/Al_2O_3$ molar ratio is from 20 to 50, an average SEM particle size of the β-type zeolite containing from 1 to 10% by weight of iron is from 0.3 to 2.0 μm.

(5) The SCR catalyst as set forth above in (1), wherein preferably, an $SiO_2/Al_2O_3$ molar ratio is from 25 to 45, and an average SEM particle size of the β-type zeolite containing from 1.5 to 3.5% by weight of iron is from 0.3 to 1.0 μm.

(6) The SCR catalyst as set forth above in any one of (1) to (5), wherein preferably, a $NO_x$ reduction rate at a reaction temperature of 200° C. after hydrothermal endurance treatment at 700° C. for 20 hours under an atmosphere of a water vapor concentration of 10% by volume is from 45% to 65%.

(7) A manufacturing method for the SCR catalyst as set forth above in any one of (1) to (6), comprising calcining iron-containing β-type zeolite at 700 to 850° C. under an atmosphere of a water vapor concentration of not more than 5% by volume.

(8) The manufacturing method for the SCR catalyst as set forth above in (7), wherein preferably, the water vapor concentration is not more than 1% by volume.

(9) The manufacturing method for the SCR catalyst as set forth above in (7) or (8), wherein preferably, a maintaining time in the calcination at 700 to 850° C. is one hour or more.

(10) A reduction removal method of nitrogen oxides comprising using the SCR catalyst as set forth above in any one of (1) to (6).

Effects of the Invention

The SCR catalyst comprising iron-containing β-type zeolite according to the invention is excellent in SCR catalyst performances, in particular $NO_x$ reducibility at a low temperature even after an endurance treatment at a high temperature under a water vapor-containing atmosphere.

MODES FOR CARRYING OUT THE INVENTION

Figure 1:
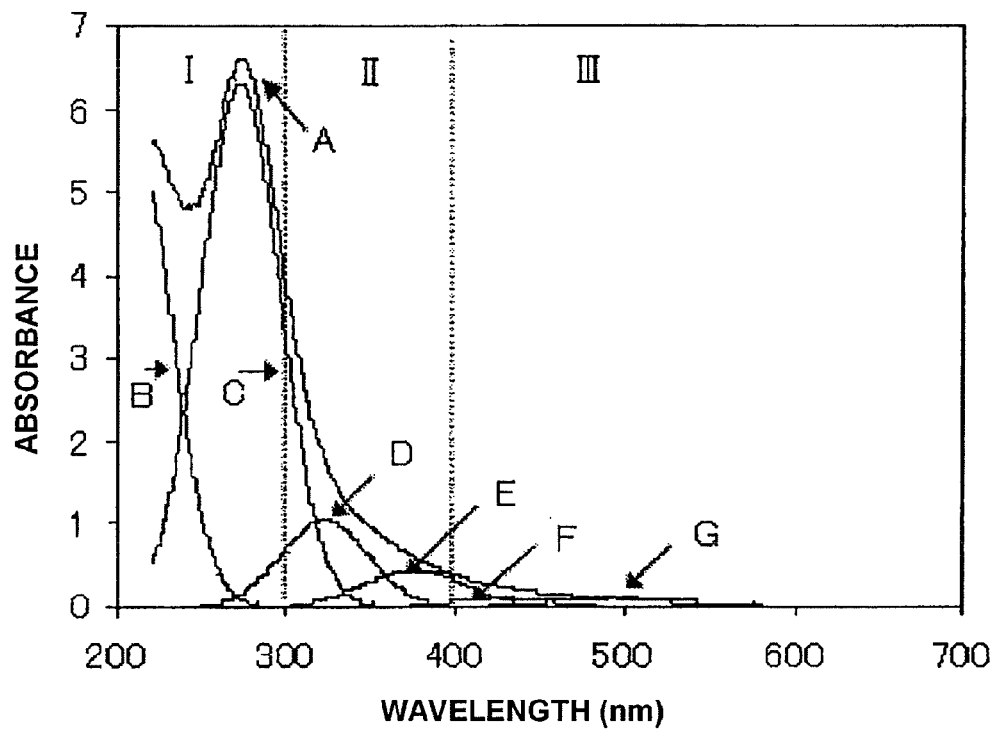
FIG. 1 is a graph showing a relation of a wavelength, and an absorbance in the ultraviolet-visible light absorption measurement of Catalyst 3 obtained in Example 3.

The SCR catalyst of the invention is hereunder described.
The SCR catalyst of the invention is constituted of iron-containing β-type zeolite. According to this, an interaction between β-type zeolite and iron is revealed, and this SCR catalyst presents excellent catalytic activity. Though details of the interaction between the zeolite and iron are not elucidated yet, it may be considered that the interaction is revealed by coordination of iron into a structural defect of zeolite (called a silanol or hydroxyl nest, etc.), or a condensation reaction of silanol on the zeolite surface and iron oxide and iron hydroxide, or the like.

In the SCR catalyst of the invention, a full width at half maximum (FWHM) on the X-ray crystal diffraction (302) plane is essentially from 0.28 to 0.34°, and preferably from 0.30 to 0.32°.

The full width at half maximum (FWHM) is an index expressing the state of crystal, and regularity of the crystal, namely a number of structural defects can be determined from this value. It is demonstrated that the larger this value, the lower the regularity of crystal is, and a lot of defects are generated in the crystal. It may be considered that an interaction between such a defective site and iron is strongly revealed, whereby the catalytic activity after the hydrothermal treatment is enhanced. On the other hand, in the case where the full width at half maximum (FWHM) is remarkably large, it may be considered that collapse of the zeolite structure per se is excessively advanced, whereby the catalytic activity is conspicuously lowered.

In consequence, a zeolite having a full width at half maximum (FWHM) of less than 0.28° is few in structural defects, and the interaction between iron and β-type zeolite is not sufficient, and therefore, the catalytic activity after the hydrothermal treatment is low. When the full width at half maximum (FWHM) exceeds 0.34°, collapse of the zeolite structure per se is excessively advanced conspicuously, and the catalytic activity is lowered.

In the SCR catalyst of the invention, a weight loss on heating to 900° C. after hydration treatment is essentially from 15.0 to 18.0% by weight, and preferably from 15.5 to 17.5% by weight.

Here, the weight loss on heating of a hydrated zeolite is a rate of loss in weight of the SCR catalyst when the SCR catalyst is heated at a prescribed temperature, and the weight loss on heating to 900° C. is a rate of loss in weight of the SCR catalyst in thermal treatment at 900° C. The weight loss on heating reflects an adsorption water content and a water content formed by dehydration condensation of a silanol site in the crystal structure. For that reason, the weight loss on heating can be used as an index of determining many or few of a surface silanol amount which is also an adsorption site of water. The smaller this value, the more advanced the reaction between silanol and iron is, and it may be considered that the catalytic activity after hydrothermal treatment is enhanced. On the other hand, in the case where this value is large, the surface silanol does not sufficiently react, and the reaction with iron is not sufficiently advanced, so that it may be considered that the SCR catalytic activity becomes low.

In consequence, in a zeolite having a weight loss on heating to 900° C. after hydration treatment of less than 15.0% by weight, collapse of the zeolite structure per se is conspicuously advanced, and the catalytic activity is low, so that the resulting zeolite is not suitable for the SCR catalyst. On the other hand, in a zeolite having a weight loss on heating to 900° C. after hydration treatment exceeding 18.0% by weight, the surface silanol does not sufficiently react, and the reaction with iron is not sufficiently advanced, so that the catalytic activity after hydrothermal treatment is low.

Though an $SiO_2/Al_2O_3$ molar ratio of β-type zeolite which is used in the invention is not particularly limited, from the standpoints of catalytic activity and skeletal structure stability, it is preferably from 20 to 50, and more preferably from 20 to 40. Also, though an average SEM particle size is not particularly limited, from the standpoints of thermal stability of the zeolite, metal dispersion and support, and easiness of manufacture, it is preferably from 0.3 to 2.0 μm. Also, in order to support iron in a highly dispersed state, it is desirable that the full width at half maximum is from 0.22 to 0.34°, and the weight loss on heating to 900° C. is from 15 to 25% by weight. When the full width at half maximum is less than 0.22°, the skeleton is too strong so that the interaction between iron and the zeolite is not advanced, whereas when it exceeds 0.34°, the skeleton is too weak so that the structure collapses in a process of supporting iron, and iron cannot be supported in a highly dispersed state. When the weight loss on heating to 900° C. is less than 15% by weight, hydrophobicity is too high so that iron cannot be supported in a highly dispersed state. For example, a zeolite whose hydrophobicity has been accelerated by a hydrothermal treatment or an acid treatment is not suitable. Also, a zeolite having a weight loss on heating to 900° C. of exceeding 25% by weight, in which acid points and lattice defects are too large, cannot support iron in a highly dispersed state because the structure collapses in a process of supporting iron. For example, a zeolite having an $SiO_2/Al_2O_3$ molar ratio of less than 20 and an average SEM particle size of less than 0.3 μm is not suitable.

The SCR catalyst of the invention comprises iron-containing β-type zeolite, and an iron component which is contained in the catalyst of the invention is constituted of an isolated iron ion, an $Fe_2O_3$ cluster, and an $Fe_2O_3$ aggregated particle. As the state of iron, it is desirable that iron is present in a state of an isolated iron ion. The isolated iron ion in this catalyst is constituted of iron which is supported in a highly dispersed state on the zeolite surface and ion-exchanged iron which is present in an ion-exchanging site of zeolite.

Also, the $Fe_2O_3$ cluster exhibits a state in which several $Fe_2O_3$s are aggregated due to a thermal treatment. The $Fe_2O_3$ aggregated particle exhibits granular iron oxide in which the aggregation of the $Fe_2O_3$ cluster is more advanced, thereby assuming a reddish brown color. Such aggregated iron is remarkably low in activity as compared with the isolated iron ion, and therefore, it is desirable that both a proportion and an amount thereof are few.

An iron component which is contained in the catalyst of the invention is constituted of (I) an isolated iron ion, (II) an $Fe_2O_3$ cluster, and (III) an $Fe_2O_3$ aggregated particle, and these can be measured by the ultraviolet-visible light absorption measurement. The isolated iron ion, the $Fe_2O_3$ cluster, or the $Fe_2O_3$ aggregated particle exhibits absorption in a wavelength region of ultraviolet to visible light. In the ultraviolet-visible light absorption measurement, an absorption wavelength region of iron varies depending upon its existence state. The absorption of up to 300 nm is assigned to the isolated iron ion; the absorption of from 300 to 400 nm is assigned to the $Fe_2O_3$ cluster; and the absorption of 400 nm or more is assigned to the $Fe_2O_3$ aggregated particle. That is, in the ultraviolet-visible light spectrum, resolved waveforms B and C composed of gauss curves having a peak wavelength of about 210±10 nm and about 270±10 nm, respectively are assigned to the absorption of the isolated iron ion.

A proportion of the isolated iron ion in the ultraviolet-visible light absorption measurement is determined according to a ratio of (B) an integrated intensity at a peak wavelength of 210±10 nm and (C) an integrated intensity at a peak wavelength of 270±10 nm to (A) a total absorption integrated intensity, i.e., (proportion of isolated iron ion)=(B+C)/A, in a wavelength region of ultraviolet-visible light absorption spectrum in the range of from 220 to 700 nm. Also, an amount of the isolated iron ion can be determined by multiplying an amount of catalyst-containing iron determined by the ICP composition analysis by the proportion of isolated iron ion, i.e., (amount of isolated iron ion)=(proportion of isolated iron ion)×(amount of catalyst-containing iron).

Also, a proportion of the $Fe_2O_3$ cluster in the ultraviolet-visible light absorption measurement is determined according to a ratio of (D) an integrated intensity at a peak wavelength of 325±10 nm and (E) an integrated intensity at a peak wavelength of 380±10 nm to (A) a total absorption integrated intensity, i.e., (proportion of $Fe_2O_3$ cluster)=(D+E)/A, in a wavelength region of ultraviolet-visible light absorption spectrum in the range of from 220 to 700 nm. An amount of the $Fe_2O_3$ cluster can be determined by multiplying an amount of catalyst-containing iron determined by the ICP composition analysis by the proportion of isolated $Fe_2O_3$ cluster, i.e., (amount of $Fe_2O_3$ cluster)=(proportion of $Fe_2O_3$ cluster)×(amount of catalyst-containing iron).

Also, a proportion of the $Fe_2O_3$ aggregated particle in the ultraviolet-visible light absorption measurement is determined according to a ratio of (F) an integrated intensity at a peak wavelength of 435±10 nm and (G) an integrated intensity at a peak wavelength of 505±10 nm to (A) a total absorption integrated intensity, i.e., ($Fe_2O_3$ aggregated particle)=(F+G)/A, in a wavelength region of ultraviolet-visible light absorption spectrum in the range of from 220 to 700 nm. Also, an amount of the $Fe_2O_3$ aggregated particle can be determined by multiplying an amount of catalyst-containing iron obtained by the ICP composition analysis by the proportion of isolated $Fe_2O_3$ aggregated particle, i.e., (amount of $Fe_2O_3$ aggregated particle)=(proportion of $Fe_2O_3$ aggregated particle)×(amount of catalyst-containing iron).

In an SCR catalyst with a low nitrogen oxide purifying function, the proportion of the isolated iron ion is low. In the SCR catalyst of the invention, the proportion of the isolated iron ion in the iron contained therein is preferably 60% or more, and more preferably 70% or more. It may be considered that an upper limit of the proportion of the isolated iron ion is practically 90%. Also, an amount of the isolated iron ion is preferably 1.0% by weight or more, and more preferably 1.5% by weight or more relative to the catalyst weight. When the amount of supported iron increases, the aggregation of iron is easy to occur, and therefore, it may be considered that an upper limit thereof is practically 3.0% by weight.

The isolated iron ion is composed of one supported on the crystal surface and one present in an ion-exchange site, in particular it is preferable that the isolated iron ion is supported on the crystal surface of β-type zeolite, and it is desirable that ion-exchanged iron is few. This is because in the ion-exchanged iron, iron is easy to move through the hydrothermal treatment, a proton is generated in a site from which iron has left, and the catalyst is easily deactivated. It is desirable that the amount of ion-exchanged iron is from 0 to 1.0 wt %. The amount of ion-exchanged iron is determined from a measured value of an ion exchange capacity obtained by subjecting the catalyst to sodium exchange.

Though a content of iron is not limited, it is preferably in the range of from 1 to 10% by weight, and more preferably in the range of from 2 to 5% by weight.

Though the SCR catalyst of the invention comprises iron-containing β-type zeolite, in addition to iron, a metal of a group of elements belonging to the Group VIII or Group IB of the periodic table (namely, Co, Ni, Ru, Rh, Pd, Os, Ir, Pt, Cu, Ag, and Au), a rare earth metal, titania, or zirconia can also be additionally added as a co-catalyst component.

As a supporting method, there can be adopted a method such as an ion exchange method, an impregnation supporting method, an evaporation-to-dryness method, a precipitation supporting method, a physical mixing method, a skeletal displacement method, and the like. As a material which is used for metal supporting, all of soluble or insoluble materials such as nitrates, sulfates, acetates, chlorides, complex salts, oxides, composite oxides, and the like can be used.

In the SCR catalyst of the invention, a $NO_x$ reduction rate at a reaction temperature of 200° C. after a hydrothermal endurance treatment at 700° C. for 20 hours under an atmosphere of a water vapor concentration of 10% by volume is preferably 45% or more, and more preferably 50% or more. It may be considered that an upper limit thereof is practically 65%.

In the SCR catalyst after the hydrothermal endurance treatment, the $NO_x$ reduction rate at a reaction temperature of 200° C. is an index deciding low-temperature activity and hydrothermal endurance which are considered to be important for the SCR catalyst. So far as the $NO_x$ reduction rate at a reaction temperature of 200° C. is 45% or more, $NO_x$ can be stably treated over a long period of time.

The hydrothermal endurance treatment as referred to in the invention means that the treatment is carried out under circulation of air containing 10% by volume of a water vapor at a temperature of 700° C. for 20 hours in a volume ratio of gas flow rate to zeolite of 100 times/min. Though it has hitherto been generally carried out to evaluate an SCR catalyst in terms of a performance of hydrothermal endurance treatment, there is nothing of specifically standardized hydrothermal endurance treatment. The foregoing hydrothermal endurance test condition falls within the scope of a condition generally adopted as the hydrothermal endurance treatment condition of SCR catalyst, and it is not particularly a special condition.

Incidentally, in not only β-type zeolite but zeolites, a thermal damage at 600° C. or higher increases in an exponential function manner, and therefore, the hydrothermal endurance treatment at 700° C. for 20 hours is corresponding to a treatment at 650° C. for from 100 to 200 hours or more and a treatment at 800° C. for several hours, respectively.

The SCR catalyst of the invention can also be used upon being mixed with silica, alumina, and a binder such as a clay mineral and the like and molded. As the clay mineral which is used in carrying out molding, there can be exemplified kaolin, attapulgite, montmorillonite, bentonite, allophane, and sepiolite.

The SCR catalyst of the invention has high performances as a catalyst for purifying exhaust gas.

The SCR catalyst of the invention enhances the interaction between the zeolite and iron through a thermal treatment, thereby exhibiting high $NO_x$ decomposition properties after the hydrothermal treatment especially at a low temperature. When brought into contact with a nitrogen oxide-containing exhaust gas, the SCR catalyst of the invention is able to highly achieve exhaust gas purification.

Examples the nitrogen oxide which is purified by the invention include nitrogen monoxide, nitrogen dioxide, dinitrogen trioxide, dinitrogen tetroxide, dinitrogen monoxide, and mixtures thereof, with nitrogen monoxide, nitrogen dioxide or dinitrogen monoxide being preferable. Here, it should not be construed that a concentration of the nitrogen oxide of the exhaust gas which can be treated by the invention is limited.

Also, other components than the nitrogen oxide may be contained in the exhaust gas, and for example, a hydrocarbon, carbon monoxide, carbon dioxide, hydrogen, nitrogen, oxygen, sulfur oxide, and water may be contained. Specifically, according to the method of the invention, the nitrogen oxide can be purified from a variety of exhaust gases of diesel automobiles, gasoline automobiles, boilers, gas turbines, and the like.

The SCR catalyst of the invention is a catalyst for purifying nitrogen oxides in the presence of a reducing agent.

As the reducing agent, a hydrocarbon, carbon monoxide, hydrogen, and the like contained in the exhaust gas can be utilized, and furthermore, if desired, an appropriate reducing agent may be added to the exhaust gas and allowed to coexist. Though the reducing agent which is added to the exhaust gas is not particularly limited, examples thereof include ammonia, urea, an organic amine, a hydrocarbon, an alcohol, a ketone, carbon monoxide, hydrogen, and the like, and arbitrary mixtures thereof. In order to enhance the purification efficiency of the nitrogen oxide, ammonia, urea, an organic amine, or an arbitrary mixture thereof is preferably used.

The nitrogen oxide is transformed into innoxious nitrogen by such a reducing agent, thereby making it possible to treat the exhaust gas.

Though an addition method of such a reducing agent is not particularly limited, there can be adopted a method for directly adding a reducing component in a gaseous form; a method for spraying and vaporizing a liquid such as an aqueous solution and the like; a method for undergoing spraying and thermal decomposition; and the like. An addition amount of such a reducing agent can be arbitrarily set up such that the nitrogen oxide can be thoroughly purified.

In the purification method of nitrogen oxides of the invention, though in bringing the SCR catalyst and the exhaust gas into contact with each other, a space velocity is not particularly limited, the space velocity is preferably from 500 to 500,000 $hr^{-1}$, and from 2,000 to 300,000 $hr^{-1}$ on the weight basis.

Next, a manufacturing method the SCR catalyst of the invention is described. The SCR catalyst of the invention can be manufactured by calcining iron-containing β-type zeolite at from 700 to 850° C. under an atmosphere having a water vapor concentration of not more than 5% by volume.

In catalysts using a zeolite which is easy to cause dealuminization (Al), as in β-type zeolite, for the purpose of maintaining a skeletal structure thereof or maintaining a solid acid, dry calcination at a high temperature as from 700 to 850° C. has not hitherto been carried out. For the purpose of maintaining a skeletal structure or a solid acid, it was general to carry out decomposition of a supported iron salt or an activation treatment for getting rid of the water content in the zeolite at from 100 to 500° C. Alternatively, a dealuminizing treatment for suppressing the excessively strong activity under a water vapor atmosphere exceeding 10% by volume while maintaining the skeletal structure, or calcination under a special reducing atmosphere was usually carried out. In the invention, it has been found that a high-temperature treatment under a low-water vapor air atmosphere, which has not been carried out so far, is effective for improving the activity after the endurance treatment of SCR catalyst.

As the β-type zeolite which is used in the invention, for example, one manufactured by the method disclosed in JP-A-2008-81348 (Patent Document 6) can be used.

In the method of the invention, it is necessary to carry out calcining after allowing iron to contain. When high-temperature calcination of β-type zeolite is first carried out, the interaction between iron and β-type zeolite in the invention is not exhibited, and the activity is lowered.

There has hitherto also been proposed a method in which after the zeolite is subjected to hydrothermal treatment or thermal treatment to make it stable, the metal is allowed to contain. However, according to such a method, though the endurance of the skeletal structure of β-type zeolite can be enhanced, the interaction between iron and β-type zeolite is not enhanced, and the SCR catalytic activity of the invention is not obtained. This is because the dispersibility of iron is lowered, and the activity is lowered.

Also, ZSM-5, ferrierite, and the like are known as a zeolite structure having high heat resistance. However, though the endurance of the skeletal structure thereof is high, it is difficult to highly disperse and support iron, and an interaction between iron and the zeolite is hardly advanced, and therefore, such is not adaptable to the SCR catalyst of the invention.

It is essential to carry out the calcination in manufacturing the SCR catalyst of the invention in a water vapor concentration of not more than 5% by volume. It is preferable to carry out the calcination in a water vapor concentration of not more than 1% by volume because a hydrolysis reaction by a water vapor which depresses the interaction between iron and the zeolite is suppressed. When the water vapor concentration exceeds 5% by volume, an enhancement of performances due to the interaction between iron and β-type zeolite by a water vapor is not revealed, but the aggregation of iron is accelerated, and the activity after the hydrothermal treatment is lowered.

It is essential to carry out the calcination in manufacturing the SCR catalyst of the invention at a temperature of from 700 to 850° C. It is preferable to carry out the calcination at a temperature of from 750 to 800° C. When the calcination temperature is lower than 700° C., the acceleration of the interaction between iron and β-type zeolite is not sufficiently advanced, and the catalytic acidity of the invention cannot be obtained; whereas when it exceeds 850° C., crystal collapse of β-type zeolite is conspicuously advanced, and the catalytic acidity is lowered.

Though a calcination time in the method of the invention is not particularly limited, when the calcination time is too short, the interaction between iron and β-type zeolite is not sufficiently advanced, and therefore, it is preferable to maintain the calcination for one hour or more.

As to the iron-containing β-type zeolite prior to the calcination in manufacturing the SCR catalyst of the invention, taking the dispersibility of iron and the endurance of zeolite into consideration, it is preferable that an iron content is from 1.5 to 3.5% weight, an $SiO_2/Al_2O_3$ molar ratio is from 25 to 45, and an average SEM particle size is from 0.2 to 1.0 μm.

EXAMPLES

[Measurement of Full Width at Half Maximum (FWHM) by X-rays]

A full width at half maximum (FWHM) was determined using a main peak appearing in the vicinity of 2θ=22.6° by means of powder X-ray crystal diffraction using a Cu-Kα-ray source which is usually used.

(Hydration Treatment)

In a desiccator having a saturated aqueous solution of ammonium chloride filled in a lower part thereof, a material to be treated was placed; the inside was subjected to pressure reduction to not more than 15 Torr using a vacuum pump; the pressure reduction was then stopped; and the resultant was allowed to stand for 12 hours or more while closing the inside, thereby carrying out a hydration treatment.

(Measurement of weight loss on heating to 900° C. after hydration treatment)

The material to be measured, which had been subjected to a hydration treatment, was put into a crucible, and its weight was measured. Thereafter, the material was subjected to temperature elevation from room temperature to 900° C. over 3 hours under circulation of dry air by a muffle furnace; after keeping at 900° C. for 5 hours, the resulting material was sufficiently cooled to room temperature in a desiccator filled with a silica gel; and its weight was measured to determine a weight loss on heating to 900° C.

That is, the weight loss on heating to 900° C. was determined according to the following equation:

Weight loss on heating (% by weight)={(Weight of material to be measured before heating)−(Weight of material to be measure after heating)}/(Weight of material to be measured before heating)×100

In order to determine a precise weight loss on heating, the weight of the material to be measured was measured immediately after the hydration treatment such that the adsorption water content did not change during the course of allowing it to stand.

(Hydrothermal Endurance Treatment Condition)

The SCR catalyst was treated under the following atmosphere.

Temperature: 700° C.
Time: 20 hours
Water content concentration in gas: 10% by volume
Gas flow rate/zeolite volume ratio: 100 times/min (Measurement of $NO_X$ Reduction Rate)

A reduction rate of a nitrogen oxide in the case of bringing a gas having the following condition into contact therewith at a prescribed temperature was defined as a $NO_x$ reduction rate. It is general to evaluate an SCR catalyst using a gas containing a $NO_x$ gas which is generally reduced and decomposed and ammonia as a reducing agent in a ratio of 1/1. The $NO_x$ reducing condition used in the invention falls within the scope of the general condition for evaluating the $NO_x$ reducibility of usual SCR catalyst and is not particularly a special condition.

The nitrogen reducing condition adopted for the evaluation of the invention is as follows.

Treatment gas composition:
$NO_x$: 200 ppm
$NH_3$: 200 ppm
$O_2$: 10% by volume
$H_2O$: 3% by volume
Remainder: $N_2$ in valance
Flow rate of treatment gas: 1.5 liters/min
Treatment gas/catalyst volume ratio: 1,000/min (Ultraviolet-visible Light Absorption Measurement)

The ultraviolet-visible light absorption measurement was carried out using a self-registering spectrophotometer (UV-3100, manufactured by Shimadzu Corporation) equipped with an integrating sphere attachment (ISR-3100, manufactured by Shimadzu Corporation) in a sample chamber.

Scanning speed: 200 nm/min
Slit width: 5.0 nm
Base line correction: Barium sulfate powder
Measurement wavelength range: 220 to 700 nm (Amount of Ion-exchanged Iron)

As to the amount of ion-exchanged iron, after ion exchange, filtration, washing and drying, a sodium exchange weight (capacity) of the catalyst was determined by the ICP composition analysis and converted to an ion-exhanged iron capacity according to a calculation formula.

Na exchange condition:
Catalyst amount: 1 g
Ion exchange solution: 99 g of pure water+1.5 g of sodium acetate
Exchange time One hour
Exchange temperature: 30° C.
Conversion formula:

(Amount of ion-exchanged iron)={(Na exchange weight)/(Na atomic weight)}×{(Iron atomic weight)/3}

(Average SEM Particle Size)

The average SEM particle size can be determined by means of general SEM observation. The SEM particle size in this application is not an aggregated particle size to be measured by a laser diffraction scattering particle size/particle size distribution analyzer or a centrifugal sedimentation particle size/particle size distribution analyzer, but a size of primary particles constituting them. The SEM observation was carried out with a magnification of 15,000 times; 100 particles were chosen at random within a field of view and measured for the particle size, respectively; and a number average particle size thereof was calculated and defined as an average SEM particle size.

Observation magnification: 15,000 times
Measurement number: 100
Calculation method: Number average size Example 1

Catalyst 1

3.48 g of ferric nitrate nonahydrate (manufactured by Kishida Chemical Co., Ltd.) was dissolved in 4.61 g of pure water to fabricate a ferric nitrate aqueous solution. 15 g (dry weight) of β-type zeolite [$SiO_2/Al_2O_3$ molar ratio=29, average SEM particle size=0.40 full width at half maximum (FWHM) on the X-ray crystal diffraction (302) plane=0.24°, weight loss on heating to 900° C. after hydration treatment=19.6% by weight] and the subject ferric nitrate aqueous solution were well mixed for 10 minutes using a mortar such that the mixture became uniform, and the mixture was dried at 110° C. for 24 hours using a hot air plate dryer, thereby obtaining an iron-supported β-type zeolite dried material. 8 g (gross weight) of the dried material was put in a porcelin dish and calcined in an electric muffle furnace. The temperature was elevated from room temperature to 700° C. at a temperature elevation rate of 225° C./hr while blowing dry air (water vapor concentration: 0.05% by volume) at a rate of 2.0 L/min, and calcination was carried out by keeping at 700° C. for one hour. After cooling to room temperature, the subject iron-supported β-type zeolite was taken out to obtain Catalyst 1.

Catalyst 1 had a full width at half maximum (FWHM) on the X-ray crystal diffraction (302) plane of 0.30°, a content of iron of 3.2% by weight, and a weight loss on heating to 900° C. after hydration treatment of 17.5% by weight.

Also, its $NO_x$ reduction rate after the hydrothermal endurance treatment under a 10% by volume water vapor atmosphere at 700° C. for 20 hours was 46% at a reaction temperature of 200° C.

Example 2

Catalyst 2

Catalyst 2 was obtained in the same manner as that in Example 1, except that the temperature was elevated from room temperature to 750° C. at a temperature elevation rate of 207° C./hr; and that calcination was carried out by keeping at 750° C. for one hour.

Catalyst 2 had a full width at half maximum (FWHM) on the X-ray crystal diffraction (302) plane of 0.30°, a content of iron of 3.2% by weight, and a weight loss on heating to 900° C. after hydration treatment of 17.2% by weight. Its $NO_x$ reduction rate after the hydrothermal endurance treatment under a 10% by volume water vapor atmosphere at 700° C. for 20 hours was 50% at a reaction temperature of 200° C.

Example 3

Catalyst 3

Catalyst 3 was obtained in the same manner as that in Example 1, except that the temperature was elevated from room temperature to 800° C. at a temperature elevation rate of 194° C./hr; and that calcination was carried out by keeping at 800° C. for one hour.

Catalyst 3 had a full width at half maximum (FWHM) on the X-ray crystal diffraction (302) plane of 0.30°, a content of iron of 3.2% by weight, and a weight loss on heating to 900° C. after hydration treatment of 16.4% by weight. Its $NO_x$ reduction rate after the hydrothermal endurance treatment under a 10% by volume water vapor atmosphere at 700° C. for 20 hours was 55% at a reaction temperature of 200° C.

As a result of ICP analysis of the composition, the Fe content was 3.1% by weight. The ultraviolet-visible light absorption measurement was carried out. The results are shown in FIG. 1. From this figure, it became clear that a proportion of the isolated iron ion was 80%.

Also, from another ICP composition analysis, the amount of the isolated iron ion was 2.5% by weight. Also, the amount of ion-exchanged iron was 0.9% by weight.

Example 4

Catalyst 4

Catalyst 4 was obtained in the same manner as that in Example 1, except that the temperature was elevated from room temperature to 850° C. at a temperature elevation rate of 183° C./hr; and that calcination was carried out by keeping at 850° C. for one hour.

Catalyst 4 had a full width at half maximum (FWHM) on the X-ray crystal diffraction (302) plane of 0.32°, a content of iron of 3.2% by weight, and a weight loss on heating to 900° C. after hydration treatment of 15.8% by weight. Its $NO_x$ reduction rate after the hydrothermal endurance treatment under a 10% by volume water vapor atmosphere at 700° C. for 20 hours was 47% at a reaction temperature of 200° C.

Example 5

Catalyst 5

The iron-supported zeolite dried material described in Example 1 was molded into disc-shaped pellets having a diameter of 2 cm by a compression molding machine. The subject pellets were pulverized in a mortar and then subjected to particle size control in a size of from 840 to 1,410 μm by using a sieve, thereby obtaining iron-supported β-type zeolite granules. 5 mL of the subject iron-supported β-type zeolite granules were weighed in a measuring cylinder and fixed in a central part of a quartz reaction tube having a diameter of 8 mm, an inside diameter of 6 mm, and a length of 25 cm by using a quartz wool. The temperature was elevated from room temperature to 800° C. at a temperature elevation rate of 194° C./hr in a tubular electric furnace while circulating air containing a water vapor in a concentration of 5% by volume at a rate of 300 mL/min, and calcination was carried out by keeping at 800° C. for one hour. After cooling to room temperature, the subject iron-supported β-type zeolite was taken out to obtain Catalyst 5.

Catalyst 5 had a full width at half maximum (FWHM) on the X-ray crystal diffraction (302) plane of 0.28° and a weight loss on heating to 900° C. after hydration treatment of 16.2% by weight. Its $NO_x$ reduction rate after the hydrothermal endurance treatment under a 10% by volume water vapor atmosphere at 700° C. for 20 hours was 45% at a reaction temperature of 200° C.

Example 6

Catalyst 6

Catalyst 6 was obtained in the same manner as that in Example 3, except that 2.27 g of ferric nitrate nonahydrate (manufactured by Kishida Chemical Co., Ltd.) was dissolved. Catalyst 6 had a full width at half maximum (FWHM) on the X-ray crystal diffraction (302) plane of 0.30° and a weight loss on heating to 900° C. after hydration treatment of 16.5% by weight. Its $NO_x$ reduction rate after the hydrothermal endurance treatment under a 10% by volume water vapor atmosphere at 700° C. for 20 hours was 52% at a reaction temperature of 200° C. As a result of ICP analysis of the composition, the Fe content was 2.1% by weight. The ultraviolet-visible light absorption measurement was carried out. As a result, the proportion of the isolated iron ion was 76%, and the amount of the isolated iron ion was 1.6% by weight.

Comparative Example 1

Comparative Catalyst 1

Comparative Catalyst 1 was obtained in the same manner as that in Example 1, except that the temperature was elevated from room temperature to 500° C. at a temperature elevation rate of 238° C./hr; and that calcination was carried out by keeping at 500° C. for one hour.
Comparative Catalyst 1 had a full width at half maximum (FWHM) on the X-ray crystal diffraction (302) plane of 0.24° and a weight loss on heating to 900° C. after hydration treatment of 18.6% by weight. Its $NO_x$ reduction rate after the hydrothermal endurance treatment under a 10% by volume water vapor atmosphere at 700° C. for 20 hours was 39% at a reaction temperature of 200° C.
As a result of ICP analysis of the composition, the Fe content was 3.1% by weight. Also, the amount of ion-exchanged iron was 1.1% by weight.

Comparative Example 2

Comparative Catalyst 2

Comparative Catalyst 2 was obtained in the same manner as that in Example 1, except that the temperature was elevated from room temperature to 600° C. at a temperature elevation rate of 230° C./hr; and that calcination was carried out by keeping at 600° C. for one hour.
This Comparative Catalyst 2 had a full width at half maximum (FWHM) on the X-ray crystal diffraction (302) plane of 0.24° and a weight loss on heating to 900° C. after hydration treatment of 18.3% by weight. Its $NO_x$ reduction rate after the hydrothermal endurance treatment under a 10% by volume water vapor atmosphere at 700° C. for 20 hours was 39% at a reaction temperature of 200° C.

Comparative Example 3

Comparative Catalyst 3

Comparative Catalyst 3 was obtained in the same manner as that in Example 1, except that the temperature was elevated from room temperature to 900° C. at a temperature elevation rate of 175° C./hr; and that calcination was carried out by keeping at 900° C. for one hour.
This Comparative Catalyst 3 had a full width at half maximum (FWHM) on the X-ray crystal diffraction (302) plane of 0.40° and a weight loss on heating to 900° C. after hydration treatment of 10.8% by weight. Its $NO_x$ reduction rate after the hydrothermal endurance treatment under a 10% by volume water vapor atmosphere at 700° C. for 20 hours was 24% at a reaction temperature of 200° C.

Comparative Example 4

Comparative Catalyst 4

Comparative Catalyst 4 was obtained in the same manner as that in Example 5, except that the calcination was carried out while circulating air containing a water vapor in a concentration of 10% by volume.
Comparative Catalyst 4 had a full width at half maximum (FWHM) on the X-ray crystal diffraction (302) plane of 0.26° and a weight loss on heating to 900° C. after hydration treatment of 16.0% by weight. Its $NO_x$ reduction rate after the hydrothermal endurance treatment under a 10% by volume water vapor atmosphere at 700° C. for 20 hours was 39% at a reaction temperature of 200° C.

Comparative Example 5

Comparative Catalyst 5

Comparative Example 5 was obtained in the same manner as that in Example 1, except that HSZ-940HOA, manufactured by Tosoh Corporation [$SiO_2/Al_2O_3$ molar ratio=40, average SEM particle size=0.60 μm, full width at half maximum (FWHM) on the X-ray crystal diffraction (302) plane=0.22°, weight loss on heating to 900° C. after hydration treatment=13.6% by weight] was used as the β-type zeolite; that the temperature was elevated from room temperature to 500° C. at a temperature elevation rate of 238° C./hr; and that calcination was carried out by keeping at 500° C. for one hour.
Comparative Catalyst 5 had a full width at half maximum (FWHM) on the X-ray crystal diffraction (302) plane of 0.22° and a weight loss on heating to 900° C. after hydration treatment of 13.7% by weight. Its $NO_x$ reduction rate after the hydrothermal endurance treatment under a 10% by volume water vapor atmosphere at 700° C. for 20 hours was 28% at a reaction temperature of 200° C.
As a result of ICP analysis of the composition, the Fe content was 3.0% by weight. The ultraviolet-visible light absorption measurement was carried out. As a result, the proportion of the isolated iron ion was 53%, and the amount of the isolated iron ion was 1.6% by weight.

Comparative Example 6

Comparative Catalyst 6

Comparative Example 6 was obtained in the same manner as that in Example 1, except that HSZ-930HOA, manufactured by Tosoh Corporation [$SiO_2/Al_2O_3$ molar ratio=27, average SEM particle size=0.20 μm, full width at half maximum (FWHM) on the X-ray crystal diffraction (302) plane=0.34°, weight loss on heating to 900° C. after hydration treatment=26.3% by weight] was used as the β-type zeolite; that the temperature was elevated from room temperature to 500° C. at a temperature elevation rate of 238° C./hr; and that calcination was carried out by keeping at 500° C. for one hour.

Comparative Catalyst 6 had a full width at half maximum (FWHM) on the X-ray crystal diffraction (302) plane of 0.40° and a weight loss on heating to 900° C. after hydration treatment of 26.4% by weight. Its $NO_x$ reduction rate after the hydrothermal endurance treatment under a 10% by volume water vapor atmosphere at 700° C. for 20 hours was 27% at a reaction temperature of 200° C.

As a result of ICP analysis of the composition, the Fe content was 3.0% by weight. The ultraviolet-visible light absorption measurement was carried out. As a result, the proportion of the isolated iron ion was 40%, and the amount of the isolated iron ion was 1.2% by weight.

Comparative Example 7

Comparative Catalyst 7

21.2 g (dry weight) of β-type zeolite [$SiO_2/Al_2O_3$ molar ratio=29, average SEM particle size=0.40 μm, full width at half maximum (FWHM) on the X-ray crystal diffraction (302) plane=0.24°, weight loss on heating to 900° C. after hydration treatment=19.6% by weight] was added in a solution having 30.0 g of sodium acetate dissolved in 179 g of pure water, and the mixture was subjected to an ion exchange treatment at a liquid temperature of 30° C. for one hour. Thereafter, filtration and washing were carried out, and the resultant was then dried at 110° C. overnight to obtain Na-exchanged β-type zeolite.

21.2 g of the Na-exchanged β-type zeolite was added to an ion-exchanged solution having 2.55 g of iron sulfate heptahydrate dissolved in 100 g of pure water at 80° C., and ion exchange was carried out at a liquid temperature of 80° C. for one hour. Thereafter, filtration and washing were carried out, and the resultant was then dried at 110° C. overnight to obtain iron-exchanged β-type zeolite.

21.2 g of the iron-exchanged β-type zeolite was subjected to a hydrothermal treatment at 650° C. for 2 hours under a 10% by volume water vapor atmosphere and then subjected to ion exchange with an iron solution obtained by dissolving 2.55 g of iron sulfate heptahydrate in 100 g of pure water and adjusting a pH at 2 with sulfuric acid. Ion exchange was carried out for one hour while adjusting a liquid temperature at 30° C. and a pH at 2 with sulfuric acid. Filtration and washing were carried out, and the resultant was then dried at 110° C. overnight to obtain Comparative Catalyst 7.

Comparative Catalyst 7 had a full width at half maximum (FWHM) on the X-ray crystal diffraction (302) plane of 0.26° and a weight loss on heating to 900° C. after hydration treatment of 19.4% by weight. Its $NO_x$ reduction rate after the hydrothermal endurance treatment under a 10% by volume water vapor atmosphere at 700° C. for 20 hours was 28% at a reaction temperature of 200° C. As a result of ICP analysis of the composition, the $SiO_2/Al_2O_3$ molar ratio was 33, and the content of iron was 1.9% by weight.

The catalyst calcination temperature (° C.), the X-ray full width at half maximum)(°), the weight loss on heating to 900° C. (% by weight), and the $NO_x$ reduction rate (%) at 200° C. after hydrothermal endurance treatment in each of Catalysts 1, 2, 3, 4, 5 and 6 and Comparative Catalysts 1, 2, 3, 4, 5, 6 and 7 obtained in Examples 1, 2, 3, 4, 5 and 6 and Comparative Examples 1, 2, 3, 4, 5, 6 and 7, respectively are shown in the following Table 1.

TABLE 1

|  | Catalyst calcination temperature (° C.) | X-ray full width at half maximum (°) | Weight loss on heating to 900° C. (% by weight) | $NO_x$ reduction rate at 200° C. after hydrothermal endurance treatment (%) |
|---|---|---|---|---|
| Catalyst 1 | 700 | 0.30 | 17.5 | 46 |
| Catalyst 2 | 750 | 0.30 | 17.2 | 50 |
| Catalyst 3 | 800 | 0.30 | 16.4 | 55 |
| Catalyst 4 | 850 | 0.32 | 15.8 | 47 |
| Catalyst 5 | 800 | 0.28 | 16.2 | 45 |
| Catalyst 6 | 800 | 0.30 | 16.5 | 52 |
| Comparative Catalyst 1 | 500 | 0.24 | 18.6 | 39 |
| Comparative Catalyst 2 | 600 | 0.24 | 18.3 | 39 |
| Comparative Catalyst 3 | 900 | 0.40 | 10.8 | 24 |
| Comparative Catalyst 4 | 800 | 0.26 | 16.0 | 39 |
| Comparative Catalyst 5 | 500 | 0.22 | 13.7 | 28 |
| Comparative Catalyst 6 | 500 | 0.26 | 26.4 | 27 |
| Comparative Catalyst 7 | 650 | 0.26 | 19.4 | 28 |

Figure 2:
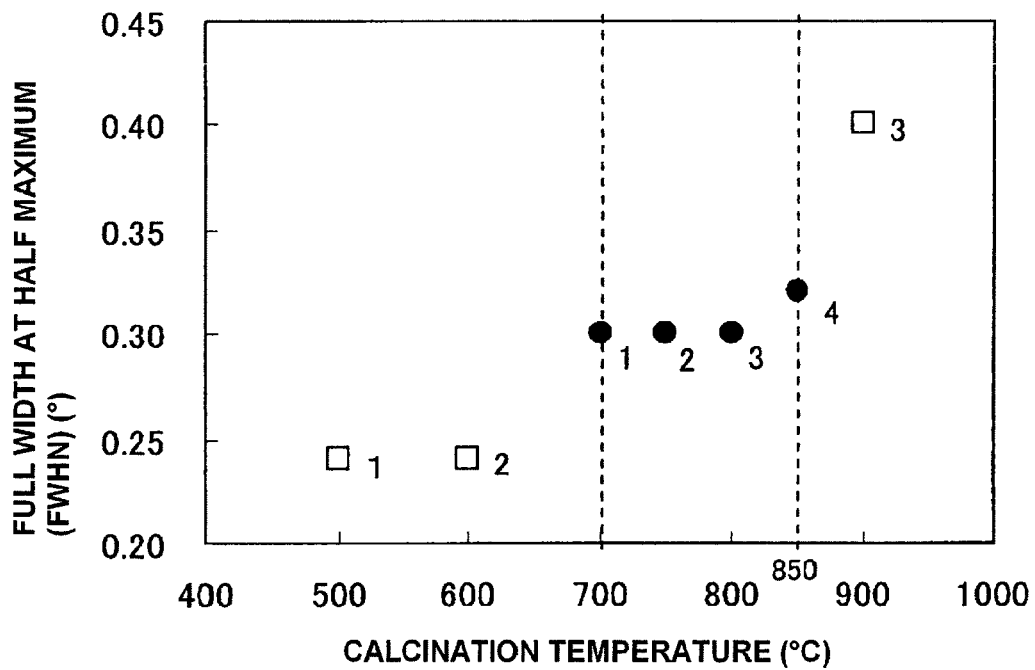
FIG. 2 is a graph showing a relation of a calcination temperature, and a full width at half maximum (FWHM) on the X-ray crystal diffraction (302) plane of each of SCR catalysts obtained Examples 1, 2, 3 and 4 and Comparative Examples 1, 2 and 3.

On the basis of these data, the change in the full width at half maximum (FWHM) on the X-ray crystal diffraction (302) plane versus the catalyst calcination temperature is shown in FIG. 2.

As is clear from this figure, the full width at half maximum (FWHM) on the X-ray crystal diffraction (302) plane is controlled within the range of from 0.28 to 0.34° as the range of the invention, by the calcination at from 700 to 850° C. as the calcination temperature range of the invention.

Figure 3:
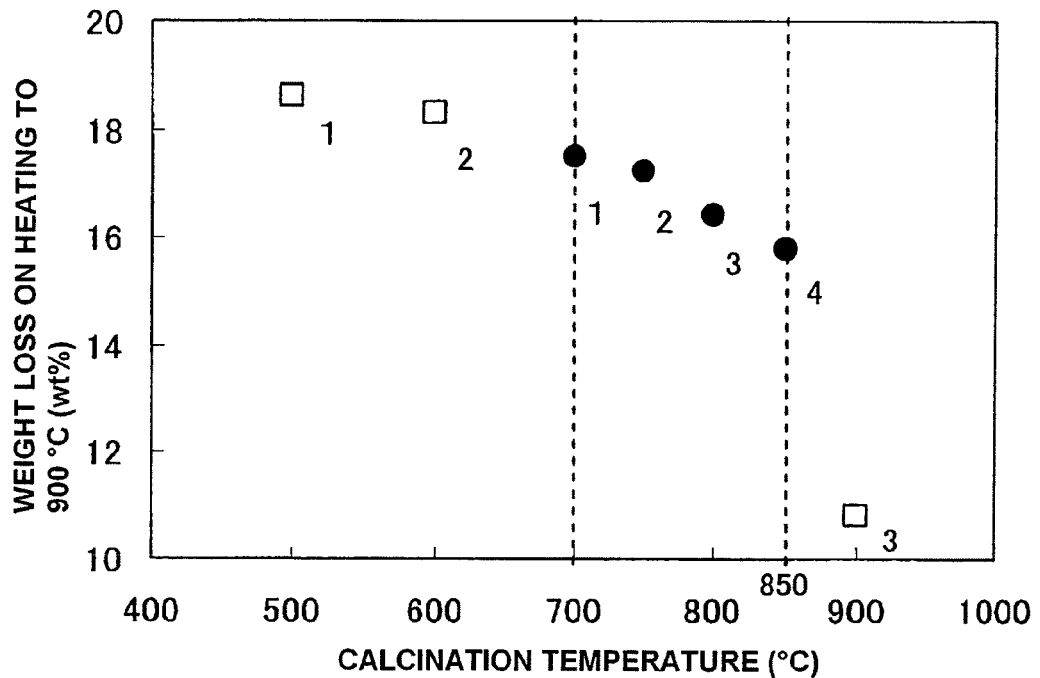
FIG. 3 is a graph showing a relation of a calcination temperature, and a weight loss on heating to 900° C. of each of SCR catalysts obtained Examples 1, 2, 3 and 4 and Comparative Examples 1, 2 and 3.

Also, the change in the weight loss on heating to 900° C. after hydration treatment versus the calcination temperature is shown in FIG. 3.

As is clear from this figure, the weight loss on heating to 900° C. is controlled within the range of from 15.0 to 18.0% by weight as the range of the invention, by the calcination at from 700 to 850° C. as the calcination temperature range of the invention.

Figure 4:
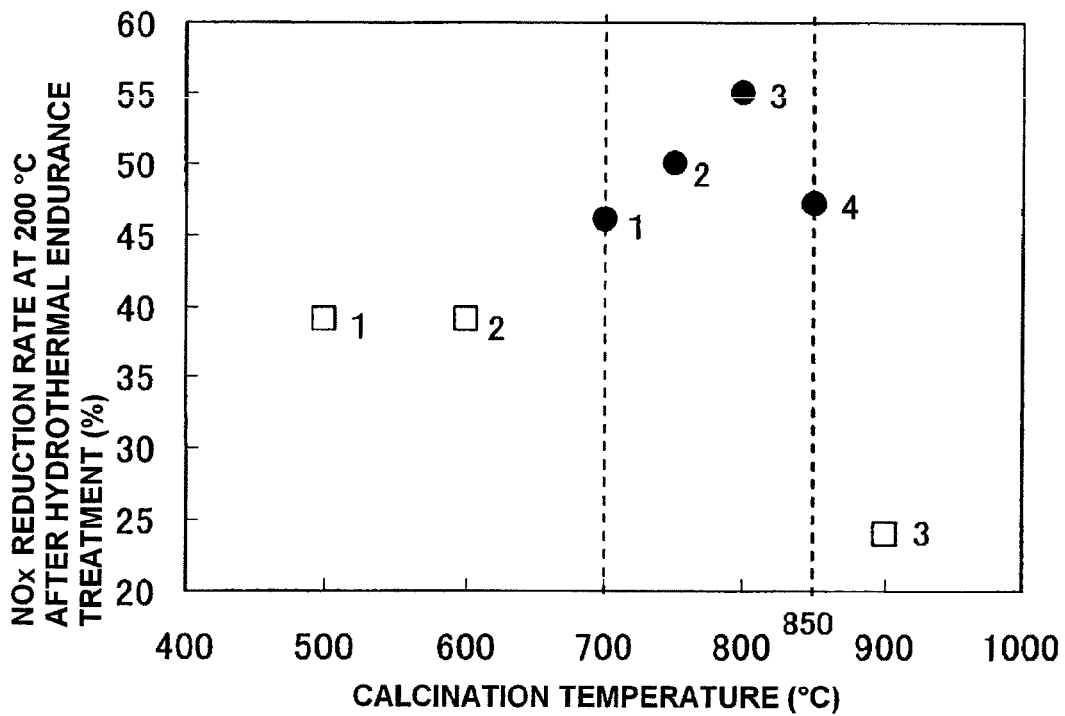
FIG. 4 is a graph showing a relation of a calcination temperature, and a $NO_x$ reduction rate at 200° C. after hydrothermal endurance treatment of each of SCR catalysts obtained Examples 1, 2, 3 and 4 and Comparative Examples 1, 2 and 3.

The $NO_x$ reduction rate at 200° C. after hydrothermal endurance treatment versus the calcination temperature is shown in FIG. 4.

As is clear from this figure, the $NO_x$ reduction rate at 200° C. after hydrothermal endurance treatment is high by the calcination at from 700 to 850° C. as the calcination temperature range of the invention.

The proportion and % by weight of the isolated iron ion, the proportion and % by weight of the $Fe_2O_3$ cluster, and the proportion and % by weight of the $Fe_2O_3$ aggregated particle in each of Catalyst 3, Catalyst 6, Comparative Catalyst 5, and Comparative Catalyst 6 obtained in Example 3, Example 6, Comparative Example 5, and Comparative Example 6, respectively are shown in Table 2.

TABLE 2

|  | Isolated iron ion | | $Fe_2O_3$ cluster | | $Fe_2O_3$ aggregated particle | |
|---|---|---|---|---|---|---|
|  | Proportion (%) | Weight (% by weight) | Proportion (%) | Weight (% by weight) | Proportion (%) | Weight (% by weight) |
| Catalyst 3 | 80 | 2.5 | 17 | 0.5 | 3 | 0.1 |
| Catalyst 6 | 76 | 1.6 | 19 | 0.4 | 5 | 0.1 |

TABLE 2-continued

|  | Isolated iron ion | | Fe$_2$O$_3$ cluster | | Fe$_2$O$_3$ aggregated particle | |
| --- | --- | --- | --- | --- | --- | --- |
|  | Proportion (%) | Weight (% by weight) | Proportion (%) | Weight (% by weight) | Proportion (%) | Weight (% by weight) |
| Comparative Catalyst 5 | 53 | 1.6 | 37 | 1.1 | 10 | 0.3 |
| Comparative Catalyst 6 | 40 | 1.2 | 37 | 1.1 | 23 | 0.7 |

Figure 5:
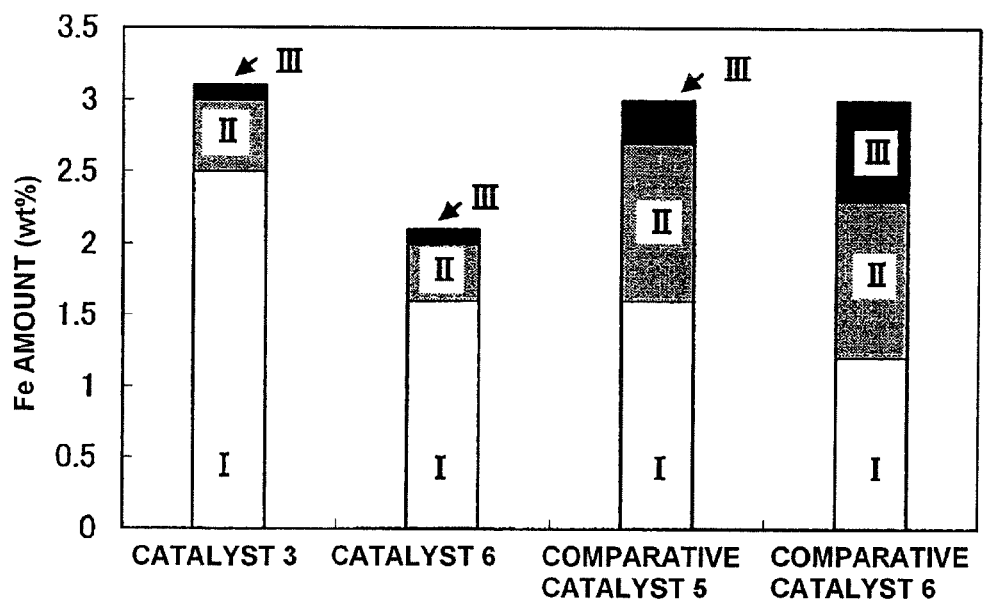
FIG. 5 is graph showing a relation of a proportion of each of an isolated iron ion (up to 300 nm), an $Fe_2O_3$ cluster (300 to 400 nm) and an $Fe_2O_3$ aggregated particle (400 nm or more), and an Fe amount (wt %) of each of Catalysts 3 and 6 obtained in Examples 3 and 6, respectively and Comparative Catalysts 5 and 6 obtained in Comparative Examples 5 and 6, respectively.

Also, % by weight in each of the states of Fe is shown in FIG. 5.

As is clear from this table, the Catalysts are large in the proportion of the isolated iron ion as compared with the Comparative Catalysts. As a result, as is clear from Table 1, the NO$_x$ reduction rate at 200° C. after hydrothermal endurance treatment is high.

The amount of ion-exchanged iron in each of Catalyst 3 and Comparative Catalyst 1 obtained in Example 3 and Comparative Example 1, respectively is shown in Table 3.

TABLE 3

|  | Amount of ion-exchanged iron (% by weight) |
| --- | --- |
| Catalyst 3 | 0.9 |
| Comparative Catalyst 1 | 1.1 |

From this table, the Catalyst is small in the amount of ion-exchanged iron as compared with the Comparative Catalyst, and as is clear from Table 1, the NO$_x$ reduction rate at 200° C. after hydrothermal endurance treatment is high.

Figure 6:
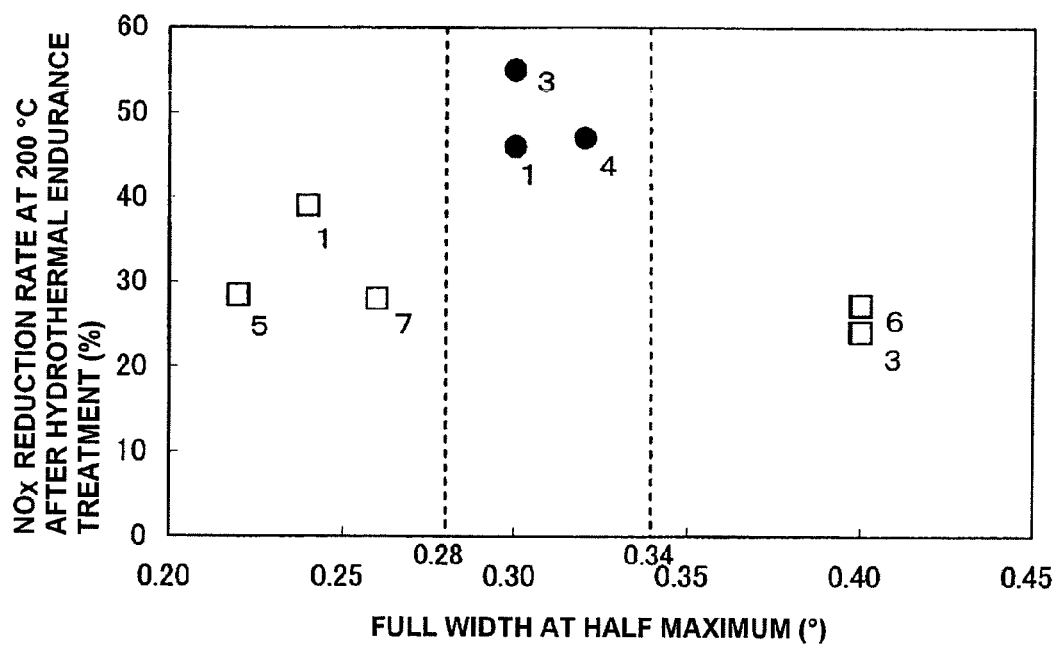
FIG. 6 is a graph showing a relation of a full width at half maximum, and a $NO_x$ reduction rate at 200° C. after hydrothermal endurance treatment of each of Catalyst 1, 3 and 4 obtained in Examples 1, 3 and 4, respectively and Comparative Catalysts 1, 3, 5, 6 and 7 obtained in Comparative Examples 1, 3, 5, 6 and 7, respectively.

The change of the NO$_x$ reduction rate at 200° C. after hydrothermal endurance treatment versus the full width at half maximum (FWHM) on the X-ray crystal diffraction (302) plane is shown in FIG. 6.

It is demonstrated that Catalyst 1, 3 or 4 of the invention falling within the range of full width at half maximum of from 0.28 to 0.34° according to the invention is high in the NO$_x$ reduction rate at 200° C. after hydrothermal endurance treatment, as compared with Comparative Catalyst 1, 3, 5, 6 or 7 falling outside the foregoing range.

Figure 7:
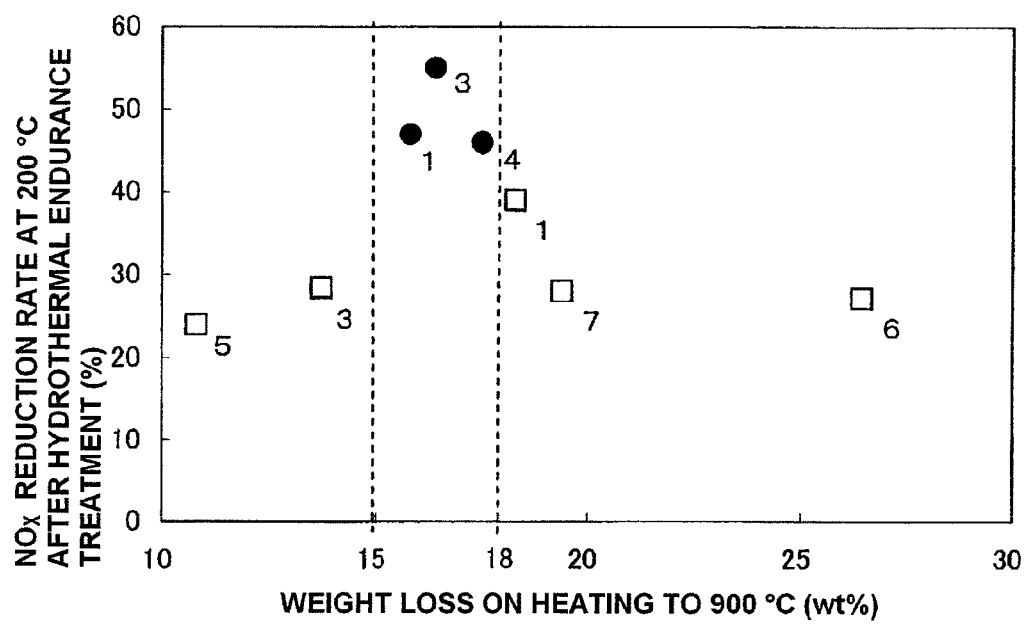
FIG. 7 is a graph showing a relation of a weight loss on heating to 900° C., and a $NO_x$ reduction rate at 200° C. after hydrothermal endurance treatment of each of Catalysts 1, 3 and 4 obtained in Examples 1, 3 and 4, respectively and Comparative Catalysts 1, 3, 5, 6 and 7 obtained in Comparative Examples 1, 3, 5, 6 and 7, respectively.

Also, the change of the NO$_x$ reduction rate at 200° C. after hydrothermal endurance treatment versus the weight loss on heating to 900° C. is shown in FIG. 7.

It is demonstrated that Catalyst 1, 3 or 4 of the invention falling within the range of weight loss on heating to 900° C. of from 15.0 to 18.0% by weight according to the invention is high in the NO$_x$ reduction rate at 200° C. after hydrothermal endurance treatment, as compared with Comparative Catalyst 1, 3, 5, 6 or 7 falling outside the foregoing range.

While the invention has been described in detail and with reference to specific embodiments thereof, it will be apparent to one skilled in the art that various changes and modifications can be made therein without departing from the spirit and scope thereof.

This application is based on Japanese Patent Application filed on Aug. 27, 2009 (Patent Application No. 2009-196640), the contents of which are incorporated herein by way of reference.

Industrial Applicability

The SCR catalyst of the invention can be utilized for purifying nitrogen oxides in an automobile exhaust gas in the presence of a reducing agent. In consequence, the industrial value of the invention is remarkable.

EXPLANATIONS OF LETTERS OR NUMERALS

I: Isolated iron ion (up to 300 nm)
II: Fe$_2$O$_3$ cluster (300 to 400 nm)
III: Fe$_2$O$_3$ aggregated particle (400 nm or more)
A: Total absorption integrated intensity
B, C: Isolated iron peak
D, E: Fe$_2$O$_3$ cluster peak
F, G: Fe$_2$O$_3$ aggregated particle peak
●1, ●2, ●3, ●4: Catalyst
□1, □2, □3, □4, □5, □6, □7: Comparative Catalyst

The invention claimed is:

1. An SCR catalyst comprising iron-containing β-type zeolite having a full width at half maximum (FWHM) on the X-ray crystal diffraction (302) plane of from 0.28 to 0.34° and a weight loss on heating to 900 ° C. after standing for 12 hours or more in a desiccator which has a saturated aqueous solution of ammonium chloride filled in a lower part thereof and has an internal pressure of not more than 15 Torr of from 15.0 to 18.0% by weight.

2. The SCR catalyst as claimed in claim 1, wherein a proportion of an isolated iron ion relative to the whole amount of iron contained in the catalyst is from 60 to 90%, and an amount of the isolated iron ion is from 1.0 to 3.0% by weight relative to the catalyst weight.

3. The SCR catalyst as claimed in claim 1, wherein an amount of ion-exchanged iron contained in the catalyst is from 0 to 1.0% by weight relative to the catalyst weight.

4. The SCR catalyst as claimed in claim 1, wherein an SiO$_2$/Al$_2$O$_3$ molar ratio is from 20 to 50, an average SEM particle size of the β-type zeolite containing from 1 to 10% by weight of iron is from 0.3 to 2.0 μm.

5. The SCR catalyst as claimed in claim 1, wherein an SiO$_2$/Al$_2$O$_3$ molar ratio is from 25 to 45, and an average SEM particle size of the β-type zeolite containing from 1.5 to 3.5% by weight of iron is from 0.3 to 1.0 μm.

6. The SCR catalyst as claimed in claim 1, wherein a NO$_x$ reduction rate at a reaction temperature of 200 ° C. after hydrothermal endurance treatment at 700 ° C. for 20 hours under an atmosphere of a water vapor concentration of 10% by volume is from 45% to 65%.

7. A manufacturing method for the SCR catalyst as described in claim 1, comprising calcining iron-containing β-type zeolite at 700 to 850 ° C. under an atmosphere of a water vapor concentration of not more than 5% by volume.

8. The manufacturing method for the SCR catalyst as claimed in claim 7, wherein the water vapor concentration is not more than 1% by volume.

9. The manufacturing method for the SCR catalyst as claimed in claim 7, wherein a maintaining time in the calcination at 700 to 850 ° C. is one hour or more.

* * * * *